(12) United States Patent
Watanabe (10) Patent No.: US 10,880,447 B2
(45) Date of Patent: Dec. 29, 2020

(54) IMAGE PROCESSING APPARATUS AND IMAGE PROCESSING METHOD

(71) Applicant: TOSHIBA TEC KABUSHIKI KAISHA, Tokyo (JP)

(72) Inventor: Fumiyuki Watanabe, Shizuoka (JP)

(73) Assignee: TOSHIBA TEC KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 16/544,572

(22) Filed: Aug. 19, 2019

(65) Prior Publication Data

US 2020/0137248 A1 Apr. 30, 2020

(30) Foreign Application Priority Data

Oct. 25, 2018 (JP) .................................. 2018-200905

(51) Int. Cl.
*H04N 1/00* (2006.01)
*H04N 1/203* (2006.01)
*H04N 1/393* (2006.01)

(52) U.S. Cl.
CPC ..... *H04N 1/00708* (2013.01); *H04N 1/00766* (2013.01); *H04N 1/2032* (2013.01); *H04N 1/393* (2013.01); *H04N 2201/0094* (2013.01)

(58) Field of Classification Search
None
See application file for complete search history.

(56) References Cited

U.S. PATENT DOCUMENTS

| 2006/0104683 | A1 | 5/2006 | Kelly et al. |
| 2010/0111419 | A1* | 5/2010 | Uehori ................. G06K 9/3216 |
| | | | 382/182 |
| 2016/0070219 | A1 | 3/2016 | Ono |
| 2018/0183976 | A1* | 6/2018 | Sei ..................... H04N 1/00811 |
| 2018/0198951 | A1* | 7/2018 | Onuma ............. H04N 1/00748 |

FOREIGN PATENT DOCUMENTS

| EP | 2 224 721 A1 | 9/2010 |
| JP | 2001-136376 A | 5/2001 |
| JP | 2005-268893 A | 9/2005 |
| JP | 2010-098497 A | 4/2010 |

OTHER PUBLICATIONS

Extended European Search Report issued in European Patent Application No. 19203028.6 dated Mar. 3, 2020, seven (7) pages.

* cited by examiner

*Primary Examiner* — Frantz Bataille
(74) *Attorney, Agent, or Firm* — Foley & Lardner LLP (57) ABSTRACT

An image processing apparatus includes a size acquisition unit and a decision unit. The size acquisition unit acquires first size information indicating a first sheet size of a first sheet surface read by an image reading unit. The decision unit decides second image information indicating a second image size of a second image to be stored of a second sheet surface different from the first sheet surface based on first image information indicating a first image size of a first image to be stored based on the first size information.

15 Claims, 7 Drawing Sheets

| NUMBER OF READ SHEETS | FIRST SIZE INFORMATION | SECOND SIZE INFORMATION |
|---|---|---|
| FIRST SHEET | 297 × 420mm | 307 × 430mm |
| SECOND SHEET | 210 × 297mm | 200 × 287mm |
| THIRD SHEET | 182 × 257mm | 192 × 257mm |
| ⋮ | ⋮ | ⋮ |

FIG. 6

FIRST SHEET SURFACE

SECOND SHEET SURFACE

FIG. 8

IMAGE PROCESSING APPARATUS AND IMAGE PROCESSING METHOD

CROSS-REFERENCE TO RELATED APPLICATION

This application is based upon and claims the benefit of priority from Japanese Patent Application No. 2018-200905, filed Oct. 25, 2018, the entire contents of which are incorporated herein by reference.

FIELD

Embodiments described herein relate generally to an image processing apparatus and an image processing method.

BACKGROUND

Multifunction peripherals (MFPs) have a function of enabling documents with atypical sizes (hereinafter referred to as "atypical-size documents") to be scanned. As methods of scanning atypical-size documents, there are manual scanning and automatic scanning. The manual scanning is a scanning method of manually deciding the size of an atypical-size document. The automatic scanning is a scanning method of allowing an MFP to automatically decide the size of an atypical document. In the manual scanning, a user acquires the width and the height of an atypical-size document in advance and inputs the width and the height of the atypical-size document to an MFP. In the automatic scanning, an atypical-size document is scanned using a sufficiently large reading range and an image of the document is extracted from an image obtained through the scanning.

In the automatic scanning, however, images of the front surface and the back surface are generated with different image sizes despite the same document in some cases. In these cases, there is a possibility of inconvenience occurring for a user.

DETAILED DESCRIPTION

Embodiments provide an image processing apparatus and an image processing method capable of generating an image of which convenience is high for a user when the front surface and the back surface of an image are read through automatic scanning.

In general, according to one embodiment, an image processing apparatus includes a size acquisition unit and a decision unit. The size acquisition unit acquires first size information indicating a size of a first sheet surface of a sheet read by an image reading unit. The decision unit decides second image information indicating a size of an image to be stored of a second sheet surface different from the first sheet surface of the sheet based on first image information indicating a size of an image to be stored based on the first size information.

Hereinafter, an image processing apparatus and an image processing method according to the embodiment will be described with reference to the drawings.

Figure 1:
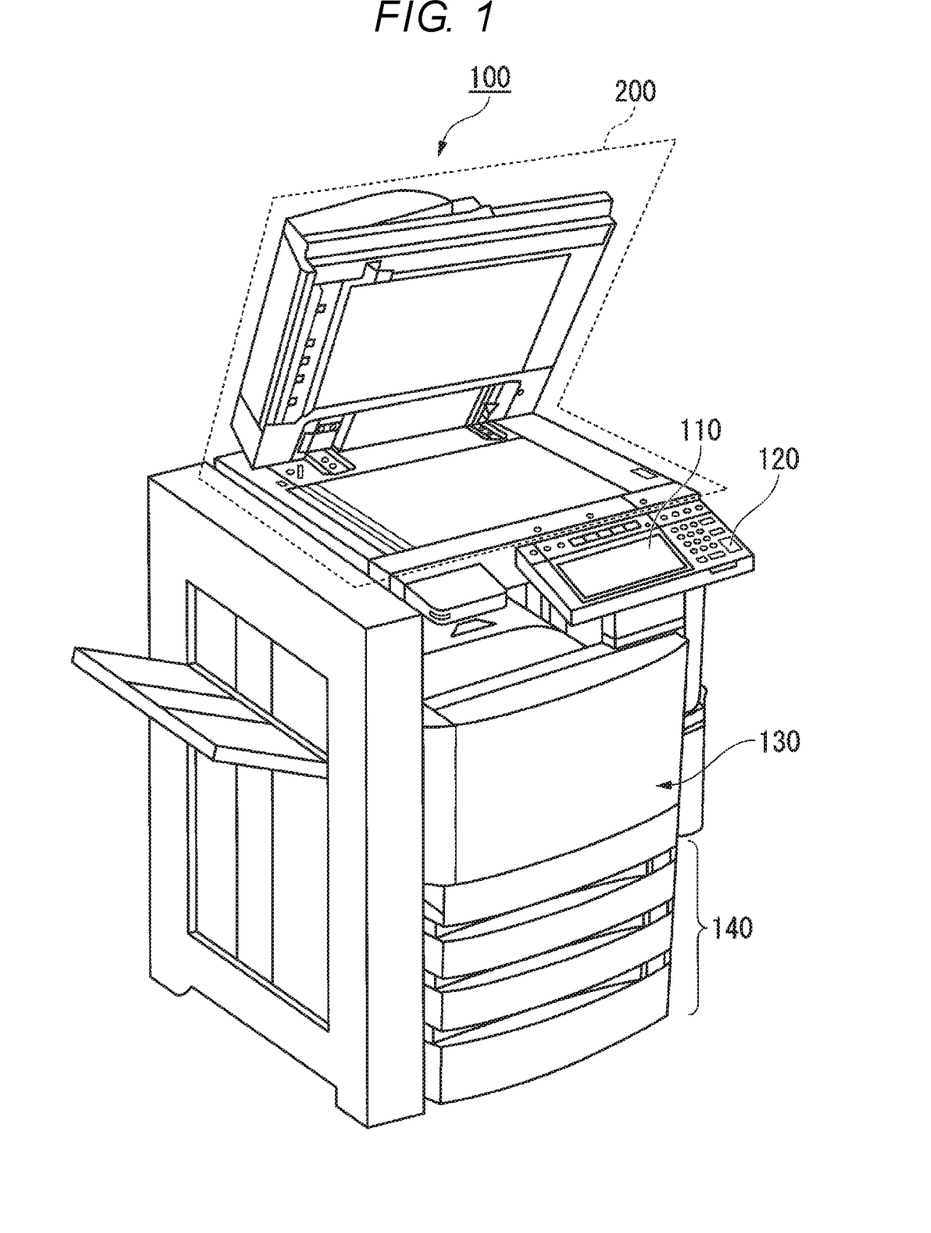
FIG. 1 is an external view illustrating an overall configuration example of an image processing apparatus according to an embodiment.

FIG. 1 is an external view illustrating an overall configuration example of an image processing apparatus 100 according to the embodiment. The image processing apparatus 100 is, for example, an image forming apparatus such as a multifunction peripheral. The image processing apparatus 100 includes a display 110, a control panel 120, a printer 130, a sheet accommodation unit 140, and an image reading unit 200. The printer 130 of the image processing apparatus 100 may be an apparatus that fixes a toner image or may be an ink jet apparatus.

The image processing apparatus 100 reads an image shown on a sheet, generates digital data, and generates an image file. The sheet is, for example, a document or a paper sheet on which text, an image, or the like is described. The sheet may be anything as long as the image processing apparatus 100 can read the sheet.

The display 110 is an image display device such as a liquid crystal display or an organic electroluminescence (EL) display. The display 110 displays various kinds of information regarding the image processing apparatus 100.

The control panel 120 includes a plurality of buttons. The control panel 120 receives an operation from a user. The control panel 120 outputs a signal to a controller of the image forming apparatus 100 in response to an operation performed by the user. The display 110 and the control panel 120 may be configured as an integrated touch panel.

The printer 130 forms an image on a sheet based on image information generated by the image reading unit 200 or image information received via a communication line. The printer 130 forms an image, for example, through the following process. An image forming unit of the printer 130 forms an electrostatic latent image on a photosensitive drum based on the image information. The image forming unit of the printer 130 forms a visible image by attaching a developer to the electrostatic latent image. As a specific example of the developer, there is a toner. A transfer unit of the printer 130 transfers the visible image to a sheet. A fixing unit of the printer 130 fixes the transferred visible image to the sheet by heating and pressurizing the sheet. The sheet on which the image is formed may be a sheet accommodated in the sheet accommodation unit 140 or may be a manually inserted sheet.

The sheet accommodation unit 140 accommodates sheets used to form images in the printer 130.

The image reading unit 200 reads reading target image information as lightness and darkness of light. The image reading unit 200 records the read image information. The recorded image information may be transmitted to another information processing device via a network. The recorded image information may be formed as an image on a sheet by the printer 130. The image reading unit 200 may include an automated document feeder (ADF) 210. In this case, a plurality of documents set at a time in the ADF 210 may be read as one document set.

Figure 2:
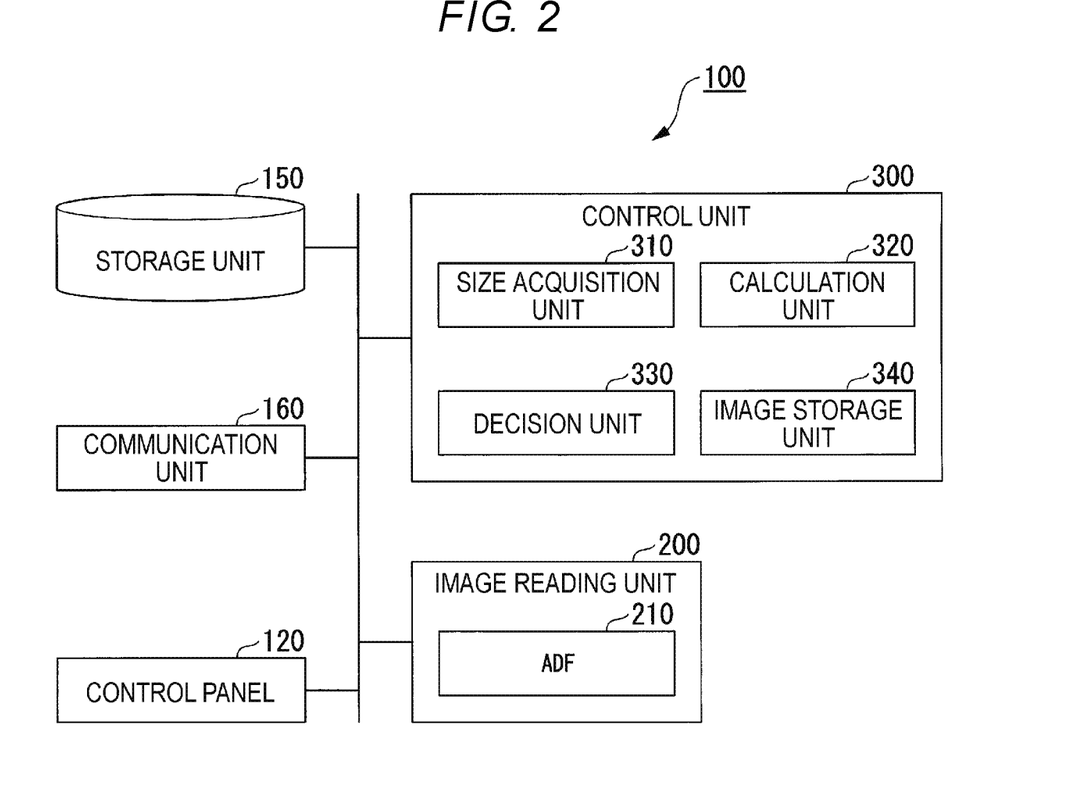
FIG. 2 is a schematic block diagram illustrating a configuration of a functional block of the image processing apparatus.

FIG. 2 is a schematic block diagram illustrating a configuration of a functional block of the image processing apparatus 100 according to the embodiment. The image processing apparatus 100 includes the control panel 120, a storage unit 150, a communication unit 160, the image reading unit 200, and a control unit 300. The control panel 120 and the image reading unit 200 described with reference to FIG. 1 will not be described in FIG. 2.

The storage unit 150 is configured as a storage device such as a magnetic hard disk device or a semiconductor storage device. The storage unit 150 stores a size information table.

Figure 3:
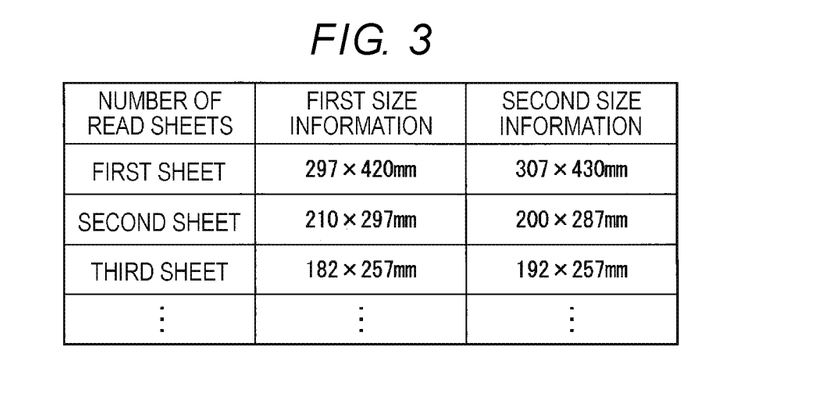
FIG. 3 is a diagram illustrating a data structure of a specific example of a size information table.

FIG. 3 is a diagram illustrating a data structure of a specific example of a size information table. The size information table is a table in which the horizontal and vertical sizes of an atypical-size document read by the image processing apparatus 100 are registered. The storage unit 150 stores the size of the front surface (hereinafter referred to as "first size information") of the atypical-size document read by the image reading unit 200 in association with the size of the back surface of the atypical-size document (hereinafter referred to as "second size information"). In the embodiment, the size of the document is assumed to be expressed in a combination of the vertical length (height) and the horizontal length (width).

Referring back to FIG. 2, the description will be made. The communication unit 160 is a communication interface. The communication unit 160 performs data communication with an information processing apparatus such as a server or another image forming apparatus via a network.

The control unit 300 is configured as a processor such as a central processing unit (CPU). When the processor executes a program, the control unit 300 functions as a size acquisition unit 310, a calculation unit 320, a decision unit 330, and an image storage unit 340. The control unit 300 operates as each of the foregoing functions and can store an image of the front surface and an image of the back surface of an atypical-size document from a scanned file generated by the image reading unit 200. In the following description, the stored image of the front surface is defined as a first image and the stored image of the back surface is defined as a second image for description. The front surface of a sheet is a kind of first sheet surface. The back surface of the sheet is a kind of second sheet surface.

The size acquisition unit 310 acquires the first size information of the first sheet surface indicating the front surface of the atypical-size document read by the image reading unit 200. The size acquisition unit 310 acquires the second size information of the second sheet surface indicating the back surface of the atypical-size document read by the image reading unit 200.

Specifically, the size acquisition unit 310 acquires the size of the atypical-size document by trimming an image when the atypical-size document is scanned. For example, to extract an image of an atypical-size document portion, the size acquisition unit 310 trims a black background region from the image when the atypical-size document is scanned. For example, the size acquisition unit 310 acquires the image of the first sheet surface and the image of the second sheet surface by trimming the atypical-size document based on the first size information and the second size information.

The size acquisition unit 310 acquires the first size information and the second size information based on the vertical and horizontal sizes of the acquired image of the first sheet surface and the acquired image of the second sheet surface. The size acquisition unit 310 registers the acquired first size information and second size information in the size information table of the storage unit 150.

The calculation unit 320 calculates the sizes (for example, the vertical length and the horizontal length) of the first image and the second image, and a document difference based on the first size information and the second size information, and the first image information and the second image information decided by the decision unit 330. The first image information is information indicating the size of the stored image of the first sheet surface. The second image information is information indicating the size of the stored image of the second sheet surface. The document difference is information indicating a difference in the vertical and horizontal sizes between the first image information and the second size information.

The calculation unit 320 calculates the foregoing sizes, for example, through the following process. First, the calculation unit 320 refers to the size information table. Subsequently, the calculation unit 320 calculates the document difference based on the first image information and the second size information. The calculation unit 320 transmits the calculated document difference to the decision unit 330.

The decision unit 330 decides the first image information and the second image information. The decision unit 330 decides the first image information and the second image information in accordance with whether the first and second images are set to be adjusted to the same size (hereinafter referred to as same size setting"). For example, when the same size setting is made, the decision unit 330 decides the first image information and the second image information as the same information. When the same size setting is not made, the decision unit 330 decides the first image information based on the first size information and decides the second image information based on the second size information. Then, the decision unit 330 transmits the decided first image information and second image information to the image storage unit 340.

The same size setting may be made when a user performs inputting or may be set in advance when the image processing apparatus 100 is shipped. A specific example of an image correction method using the calculation unit 320 and the decision unit 330 will be described below with reference to FIGS. 4 to 7.

The image storage unit 340 corrects at least one of the image of the first sheet surface and the image of the second sheet surface through trimming, scaling, or the like based on the first image information and the second image information and the document difference. The image storage unit 340 stores the corrected image as the first and second images in the storage unit 150.

Figure 4:
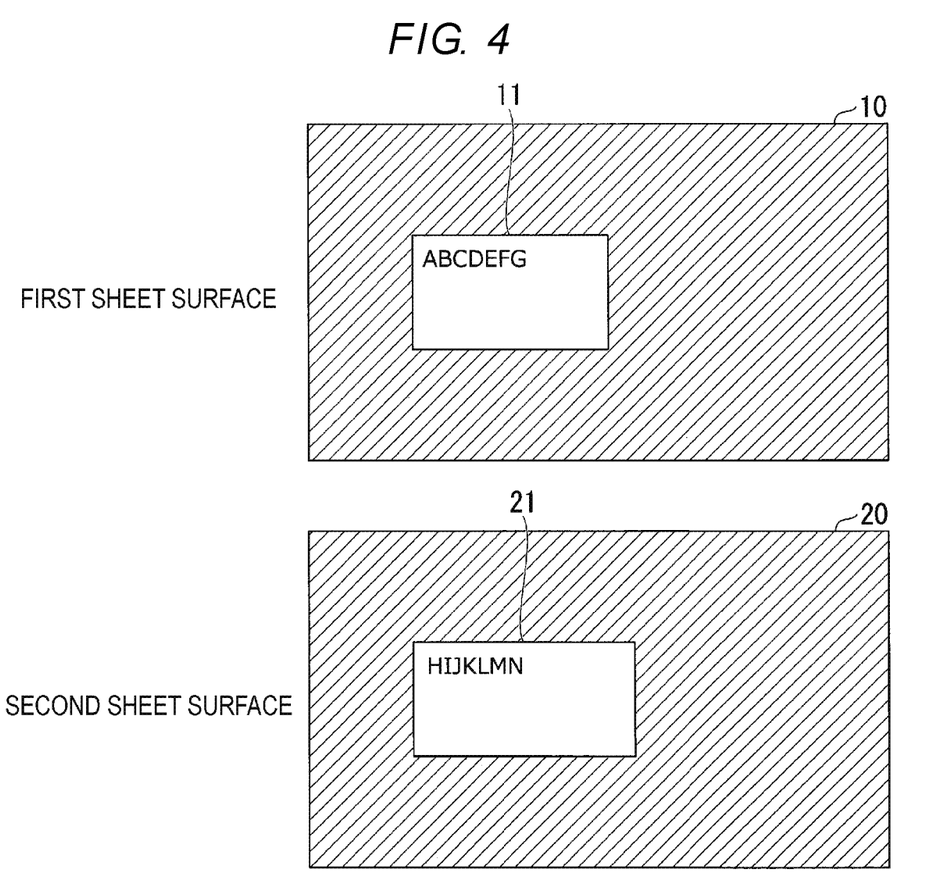
FIG. 4 is a diagram illustrating specific examples of images obtained by scanning two atypical-size documents of which one side has the same value.

FIG. 4 is a diagram illustrating specific examples of images obtained by scanning two atypical-size documents of which one side has the same value. In FIG. 4, the height of the first sheet surface and the height of the second sheet surface which are the same will be described as an example. An image of the front surface of the atypical-size document scanned by the image reading unit 200 is generated as a first scanned image 10 indicating an image including a first sheet surface 11. An image of the back surface of the atypical-size document scanned by the image reading unit 200 is generated as a second scanned image 20 indicating an image including a second sheet surface 21.

Figure 5:
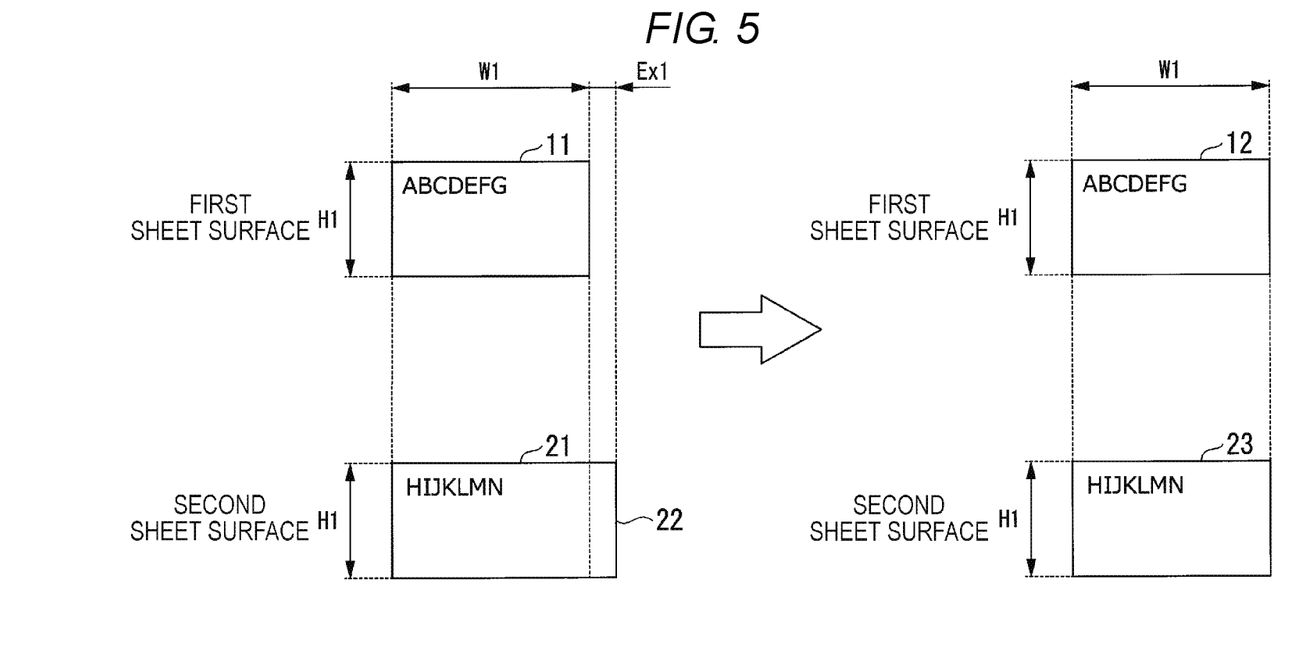
FIG. 5 is a diagram illustrating a correction specific example of atypical-size documents of which one side has the same value.

FIG. 5 is a diagram illustrating a correction specific example of atypical-size documents of which one side has the same value. In FIG. 5, the first size information decided as the first image information by the decision unit 330 will be described as an example. First, the image storage unit 340 trims the first sheet surface 11 and the second sheet surface 21 from the first scanned image 10 and the second scanned image 20. In FIG. 5, the size acquisition unit 310 acquires the width of the trimmed first sheet surface 11 and the height of the trimmed first sheet surface 11 as W1 and H1, respectively. The size acquisition unit 310 acquires the size of the second sheet surface 21 as the second size information. The size acquisition unit 310 registers the acquired size as the first size information in the size information table.

Subsequently, the decision unit 330 decides the first size information as the first image information and the second image information. The decision unit 330 decides the height and the width of the first image information as H1 and W1, respectively. The calculation unit 320 calculates the document difference based on the first image information and the second size information with reference to the size information table. The calculation unit 320 calculates a difference in length between the first image information and the second size information in the horizontal direction as a document difference Ex1. Thus, the width of the second sheet surface 21 is decided as W1+Ex1. The height of the second sheet surface 21 is H1.

As described above, in FIG. 5, the calculation unit 320 calculates the document difference in the horizontal direction as Ex1 and calculates the document difference in the vertical direction as 0. The calculation unit 320 calculates information regarding the document difference in which the difference in width is Ex1 as a first document difference 22. The calculation unit 320 transmits the calculated first document difference 22 to the decision unit 330. For example, in FIG. 5, a first image 12 and a second image 23 having the same size can be stored in the storage unit 150 by erasing the first document difference 22.

First, the image storage unit 340 erases the first document difference 22 which is the document difference between the first sheet surface 11 and the second sheet surface 21 through trimming. In FIG. 5, for example, the image storage unit 340 erases the first document difference 22 from the right side.

Subsequently, the image storage unit 340 stores the image of the first sheet surface 11 as the first image 12 based on the first image information. The image storage unit 340 stores the image of the second sheet surface 21 as the second image 23 based on the second image information. In the embodiment, the correction is performed through the trimming, as described above. For example, the second image may be corrected by scaling the second image in the horizontal direction setting the vertical direction as a reference. For example, the second image may be corrected by scaling the second image in the vertical direction setting the horizontal direction as a reference. In FIG. 5, the second sheet surface is corrected setting the first sheet surface as a reference, but the first image may be corrected setting the second sheet surface as a reference.

Figure 6:
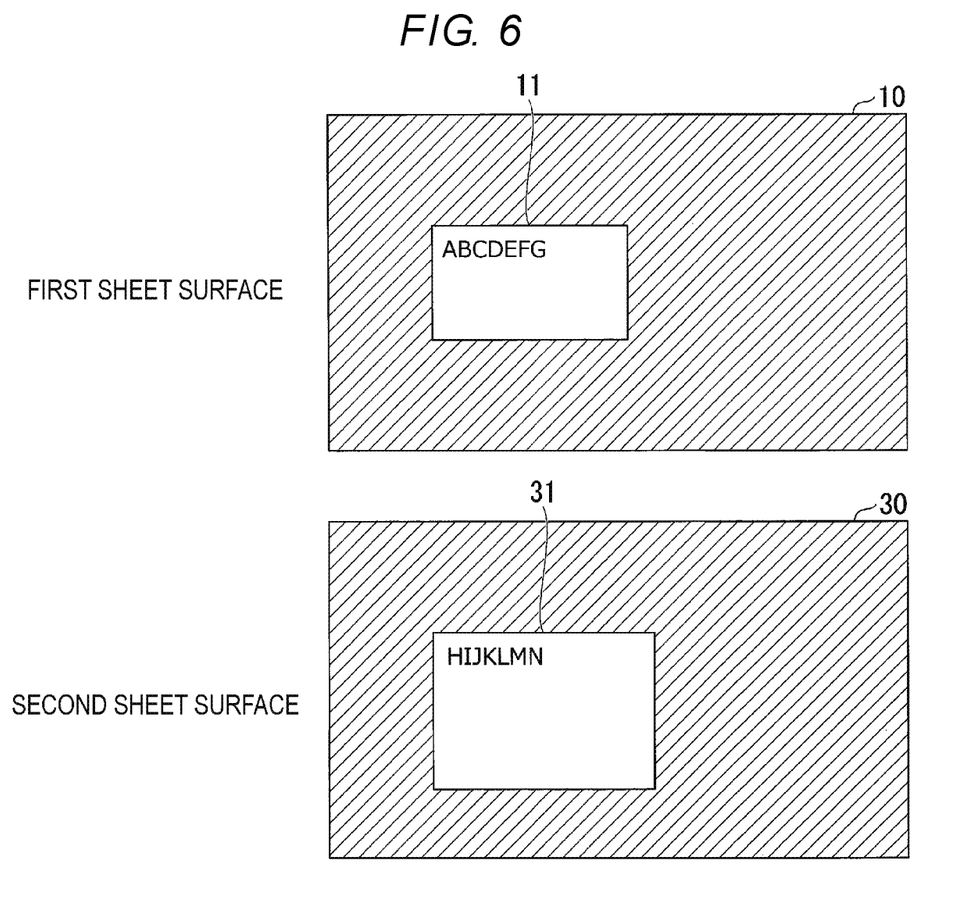
FIG. 6 is a diagram illustrating a specific example of an image obtained by scanning two atypical-size documents with different sizes.

FIG. 6 is a diagram illustrating a specific example of an image obtained by scanning two atypical-size documents with different sizes. In FIG. 6, the size of the first sheet surface and the size of the second sheet surface that are different will be described as an example. The front surface of the atypical-size document scanned by the image reading unit 200 is generated as the first scanned image 10 including the first sheet surface 11. The back surface of the atypical-size document scanned by the image reading unit 200 is generated as a second scanned image 30 including a second sheet surface 31.

Figure 7:
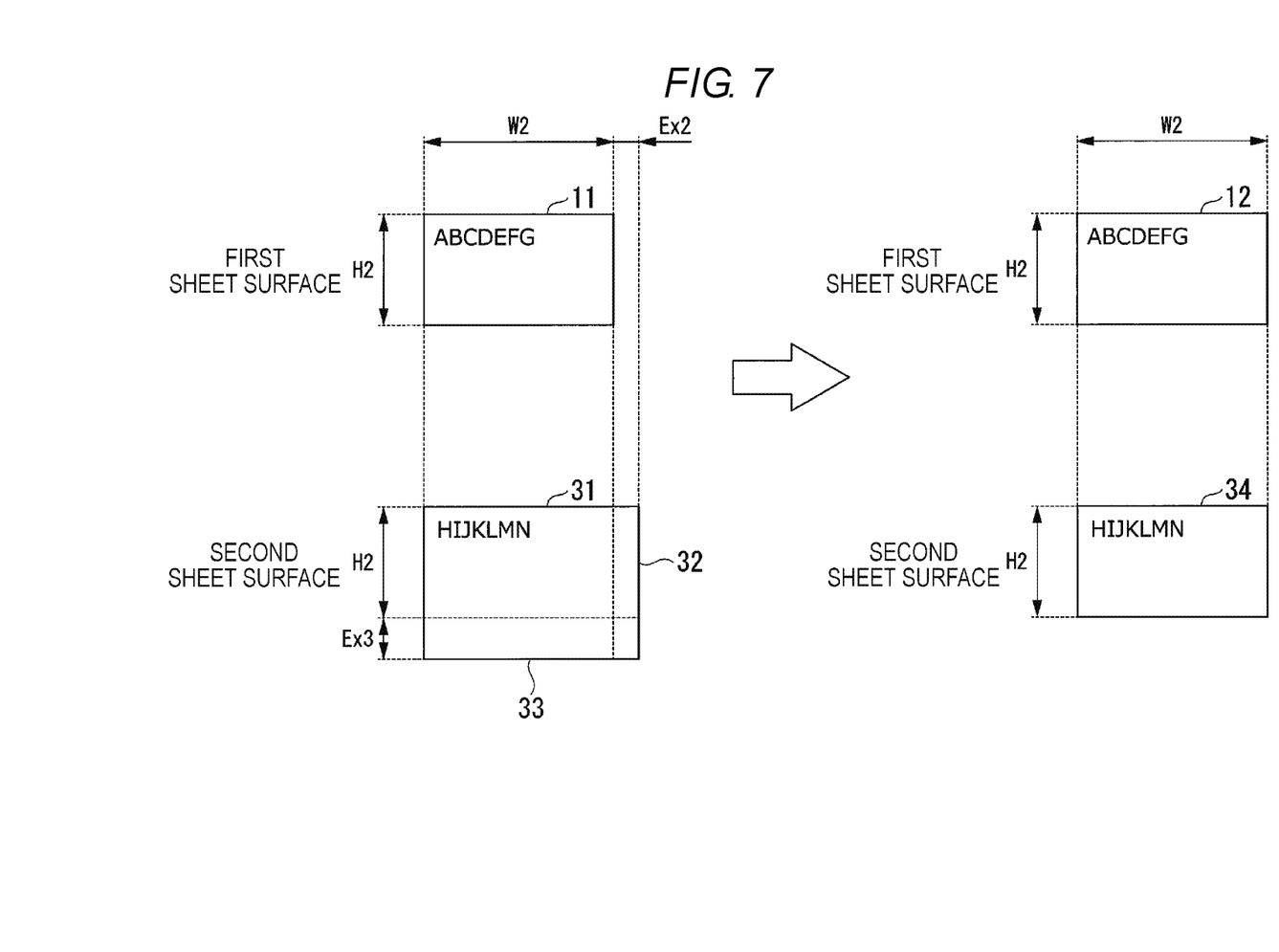
FIG. 7 is a diagram illustrating a specific example of correction of two atypical-size documents with different sizes.

FIG. 7 is a diagram illustrating a specific example of the correction of two atypical-size documents with different sizes. In FIG. 7, the first size information decided as the first image information by the decision unit 330 will be described as an example. First, the image storage unit 340 trims the first sheet surface 11 and the second sheet surface 31 from the first scanned image 10 and the second scanned image 30. In FIG. 7, the size acquisition unit 310 acquires the width of the trimmed first sheet surface 11 and the height of the first sheet surface 11 as W2 and H2, respectively. The size acquisition unit 310 acquires the size of the second sheet surface 31 as the second size information. The size acquisition unit 310 registers the acquired size as the first size information in the size information table.

Subsequently, the decision unit 330 decides the first size information as the first image information and the second image information. In FIG. 7, the decision unit 330 decides the height and the width of the first image information as H2 and W2. The calculation unit 320 calculates the document difference based on the first image information and the second size information with reference to the size information table. The calculation unit 320 calculates a difference in length in the horizontal direction between the first image information and the second size information as a document difference Ex2. The calculation unit 320 calculates a difference in length in the vertical direction between the first image information and the second size information as a document difference Ex3. Thus, the width of the second sheet surface 21 is decided as W2+Ex2. The height of the second sheet surface 31 is decided as H2+Ex3.

As described above, in FIG. 7, the calculation unit 320 calculates the document difference in the horizontal direction and the document difference in the vertical direction as Ex2 and Ex3, respectively. The calculation unit 320 calculates information regarding the document differences in which the difference in width is Ex2 and the difference in height is Ex3 as a second document difference 32 and a third document difference 33. The calculation unit 320 transmits the calculated second document difference 32 and third document difference 33 to the decision unit 330. For example, in FIG. 7, by erasing the second document difference 32 and the third document difference 33, it is possible to store the first image 12 and a second image 34 that have the same size in the storage unit 150.

First, the image storage unit 340 erases the second document difference 32 and the third document difference 33 which are the document differences between the first sheet surface 11 and the second sheet surface 31 through trimming. In FIG. 7, for example, the image storage unit 340 erases the second document difference 32 and the third document difference 33 from the right side and the lower side.

Subsequently, the image storage unit 340 stores the image of the first sheet surface 11 as the first image 12 based on the first image information. The image storage unit 340 stores the image of the second sheet surface 31 as the second image 34 based on the second image information. In the embodiment, the correction is performed through the trimming, as described above. For example, the second image may be corrected by scaling the second image in the horizontal direction setting the vertical direction as a reference. For example, the second image may be corrected by scaling the second image in the vertical direction setting the horizontal direction as a reference. In FIG. 7, the second sheet surface is corrected setting the first sheet surface as a reference, but the first image may be corrected setting the second sheet surface as a reference.

The correction of the atypical-size document in FIGS. 4 to 7 is merely one specific example. For example, the calculation unit 320 may calculate information such as an average of similarity, size, or the like based on the first size information and the second size information. For example, the image storage unit 340 may correct any of the image of the first sheet surface and the image of the second sheet surface through trimming, scaling, or the like. For example, any of the first size information and the second size information may be set as the size of a reference of an image to be stored.

Figure 8:
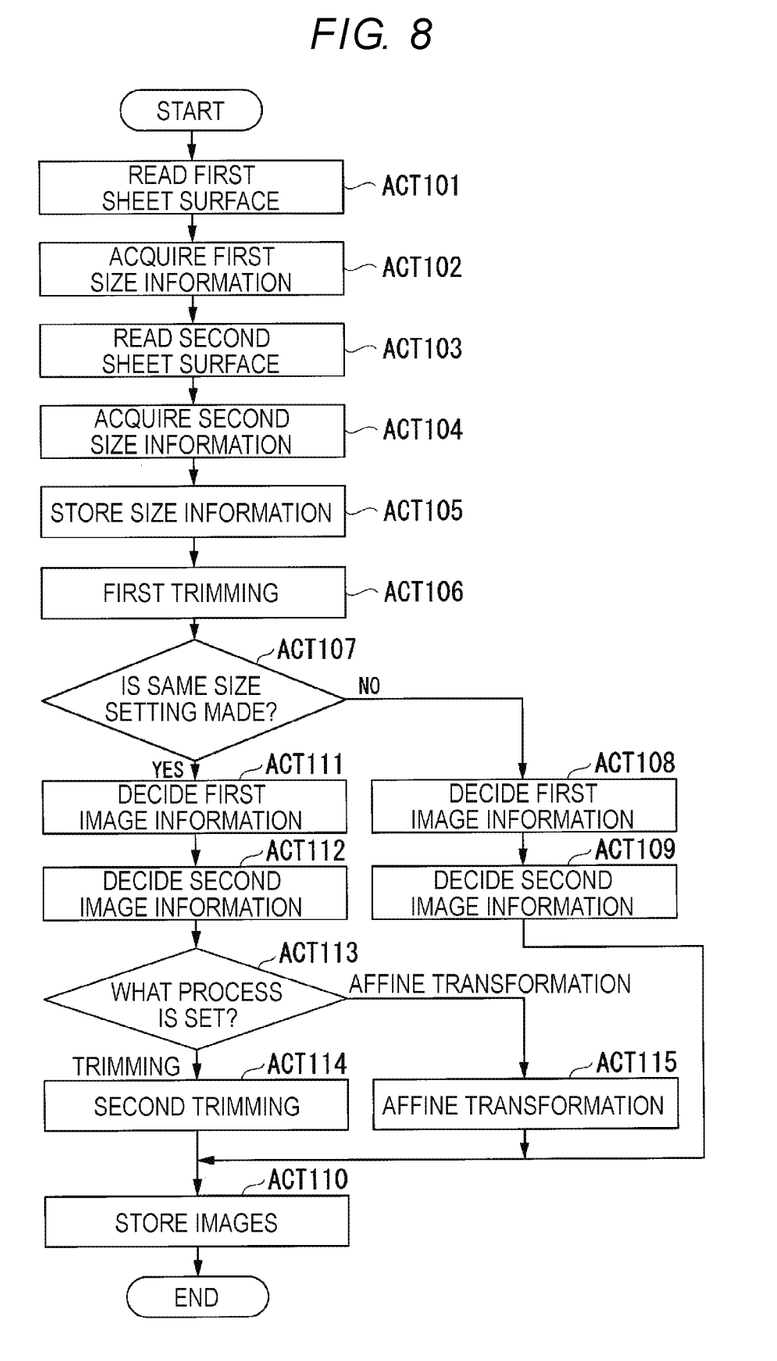
FIG. 8 is a flowchart illustrating a specific example of a flow of a process of the image processing apparatus.

FIG. 8 is a flowchart illustrating a specific example of a flow of a process of the image processing apparatus 100. The image reading unit 200 reads the first sheet surface (ACT101). The size acquisition unit 310 acquires the first size information (ACT102). The image reading unit 200 reads the second sheet surface (ACT103). The size acquisition unit 310 acquires the second size information (ACT104). The size acquisition unit 310 registers the acquired first size information and second size information in the size information table of the storage unit 150 (ACT105).

The image storage unit 340 trims and extracts the images of the first and second sheet surfaces from the image obtained by scanning an atypical-size document based on the first size information and the second size information (ACT106). The decision unit 330 determines whether the same size setting is made (ACT107). When the same size setting is not made (NO in ACT107), the decision unit 330 decides the first size information as the first image information (ACT108). The decision unit 330 decides the second size information as the second image information (ACT109). The image storage unit 340 stores the first and second images in the storage unit 150 based on the first image information and the second image information (ACT110).

When the same size setting is made (YES in ACT107), the calculation unit 320 calculates the document difference. The decision unit 330 decides the first image information based on the first size information and the difference information of the document difference received from the calculation unit 320 (ACT111). The decision unit 330 decides the second image information based on the first image information (ACT112).

The image storage unit 340 determines a process set in the same size setting (ACT113). When the process made in the same size setting is trimming (trimming in ACT113), the image storage unit 340 trims the first sheet surface or the second sheet surface. Specifically, based on the difference information, the image storage unit 340 trims at least one of the image of the first sheet surface and the image of the second sheet surface to generate the first and second images (ACT114).

When the process made in the same size setting is affine transformation (affine transformation in ACT113), the image storage unit 340 performs affine transformation on the first or second sheet surface. Specifically, the image storage unit 340 scales at least one of the images of the first and second sheet surfaces through the affine transformation based on the difference information to generate the first and second images (ACT115). After ACT114 and ACT115 are performed, the image processing apparatus 100 performs ACT110 and ends the process. The trimming and the affine transformation are examples of the embodiment and an algorithm used to correct the first and second images is not limited.

In the image processing apparatus 100 with the above configuration, the first image information is decided based on the first size information and the second size information. Then, the second image information is decided based on the first image information. Therefore, the same document can be stored as an image of which the front surface and the back surface have the same size.

MODIFICATION EXAMPLES

The size acquisition unit 310 may register the acquired first size information and second size information in the size information able and may also directly transmit the acquired first size information and second size information to the calculation unit 320 and the decision unit 330. The calculation unit 320 may determine the magnitude of the document sizes of the first and second sheets based on the first size information and the second size information. The decision unit 330 may decide the first image information based on the document difference and the second size information.

The image in which a portion is erased through the trimming or the scaling by the image storage unit 340 is not limited. Therefore, in FIG. 5, for example, the portion of the image is erased from the right side setting the left side of the first sheet surface 11 and the second sheet surface 21 as a reference, but the reference may be set in any portion. For example, the image storage unit 340 may erase the left side of the first document difference 22 setting the right side of the first sheet surface 11 and the second sheet surface 21 as a reference or may erase the first document difference 22 from both the right and left sides. For example, when one side of the same value is the width W1, the image storage unit 340 may erase the document difference from one of the upper and lower sides or from the top or the bottom.

The image in which a portion is erased through the trimming or the scaling by the image storage unit 340 is not limited. Therefore, in FIG. 7, for example, the portion of the image is described setting the upper left of the first sheet surface 11 and the second sheet surface 31 as a reference, but the reference may be set in any portion. For example, the image storage unit 340 may erase the second document difference 32 and the third document difference 33 setting the upper right side of the sheet surface as a reference. For example, the image storage unit 340 may erase the second document difference 32 and the third document difference 33 from the periphery of the second sheet surface 31.

In the embodiment, the first size information and the second size information are the front surface and the back surface of the same sheet, as described above, but the sheets may not be the same. That is, even when the number of sheets is 2, the first size information and the second size information can be acquired using two sheet surfaces. Specifically, the size acquisition unit 310 may acquire the first size information and the second size information based on a combination of reading surfaces such as a pair of the front surface of a first sheet and the front surface of a second sheet or a pair of the front surface of the first sheet and a back surface of the second sheet.

When the first and second images are scaled for correction in accordance with the similarity between the first and second images and one of the first and second images is reduced at the time of matching the sizes, the first or second image may include a background region. The first image information and the second image information may be corrected setting a smaller side in the horizontal and vertical directions as a reference or the first image information and the second image information may be corrected setting a larger side as a reference.

According to at least one of the above-described embodiments, by including the size acquisition unit 310 and the decision unit 330, it is possible to automatically detect an atypical-size document and store the front surface and the back surface as images with the same size although a user does not input the size of the document and reading regions of the front surface and the back surface of the document.

At least some of the functions of the image processing apparatus 100 according to the above-described embodiment may be realized in a computer. In this case, a program for realizing the functions may be recorded on a computer-readable recording medium. The functions may be realized by reading and executing the program recorded on the recording medium in a computer system. The "computer system" mentioned here includes an OS and hardware such as peripheral devices. The "computer-readable recording medium" refers to a storage device such as a hard disk embedded in the computer system. The storage device includes a portable medium such as a flexible disc, a magneto-optical disc, a ROM, a CD-ROM, a DVD-ROM, or a USB memory. Further, the "computer-readable recording medium" may dynamically retain a program in a short time. Specifically, the computer-readable recording medium is a communication line or the like when the program is transmitted via a network such as the Internet or a communication line such as a telephone line. The "computer-readable recording medium" may include retention of the program for a given time. Specifically, the computer-readable recording medium may be a volatile memory inside a computer system serving as a server or a client. The program may realize some of the above-described functions. Further, the program may be realized in a combination of a program in which the above-described functions are previously recorded in the computer system.

While certain embodiments have been described, these embodiments have been presented by way of example only, and are not intended to limit the scope of the inventions. Indeed, the novel embodiments described herein may be embodied in a variety of other forms: furthermore various omissions, substitutions and changes in the form of the embodiments described herein may be made without departing from the spirit of the inventions. The accompanying claims and their equivalents are intended to cover such forms or modifications as would fall within the scope and spirit of the invention.

What is claimed is:

1. An image processing apparatus comprising:
   a processor configured to:
   acquire first size information indicating a first document image size of a first sheet surface read by a scanner;
   determine whether a same size setting is set; and
   if the same size setting is set, decide second image information indicating a second image size of a second image to be stored of a second sheet surface different from the first sheet surface based on first image information indicating a first image size of a first image to be stored based on the first size information.

2. The image processing apparatus of claim 1, wherein the processor is further configured to:
   acquire second size information indicating a second document image size of the second sheet surface; and
   decide the first image information and the second image information based on the first size information and the second size information.

3. The image processing apparatus of claim 2, wherein the processor is further configured to decide the first image information and the second image information based on a magnitude relation between the first size information and the second size information.

4. The image processing apparatus of claim 2, wherein the processor is further configured to decide the first image information and the second image information based on an average of the first size information and the second size information.

5. An image processing method for controlling one computer or a plurality of computers, the image processing method comprising:
   acquiring first size information indicating a first document image size of a first sheet surface read by a scanner;
   determining whether a same size setting is set and if the same size setting is set, deciding second image information indicating a second image size of a second image to be stored of a second sheet surface different from the first sheet surface based on first image information indicating a first image size of a first image to be stored based on the first size information.

6. The image processing method of claim 5, further comprising acquiring second size information indicating a second document image size of the second sheet surface read by the scanner.

7. The image processing method of claim 6, further comprising trimming and extracting the first image of the first sheet surface and the second image of the second sheet surface based on the first size information and the second size information, respectively.

8. The image processing method of claim 7, further comprising deciding the first image information based on the first size information and the second size information.

9. The image processing method of claim 8, further comprising:
   trimming at least one of the first image or the second image based on the first image information and the second image information; and
   storing the first image and the second image following trimming the at least one of the first image or the second image.

10. The image processing method of claim 8, further comprising:
    scaling at least one of the first image or the second image based on the first image information and the second image information; and
    storing the first image and the second image following scaling the at least one of the first image or the second image.

11. An image processing apparatus comprising:
    a scanner configured to facilitate scanning sheet surfaces to generate scan data; and
    a processor configured to:
    acquire first size information indicating a first document image size of a first sheet surface based on the scan data;
    acquire second size information indicating a second document image size of a second sheet surface read based on the scan data;
    determine whether a same size setting is set;
    in response to the same size setting being set:

determine a difference between the first document image size and the second document image size based on the first size information and the second size information;

determine first image information based on the first size information and the difference, the first image information indicating a first image size of a first image to be stored of the first sheet surface;

determine second image information based on the first image information, the second image information indicating a second image size of a second image to be stored of the second sheet surface; and store the first image and the second image; and in response to the same size setting not being set:
determine the first image information based on the first size information;
determine the second image information based on the second size information; and
store the first image and the second image.

12. The image processing apparatus of claim 11, wherein the processor is further configured to perform a first trimming process to extract the first image of the first sheet surface and the second image of the second sheet surface based on the first size information and the second size information, respectively.

13. The image processing apparatus of claim 12, wherein the processor is further configured to perform a second trimming process to trim at least one of the first image or the second image based on the first image information and the second image information, and wherein the first image and the second image stored by the processor include the at least one of the first image or the second image trimmed based on the first image information and the second image information.

14. The image processing apparatus of claim 12, wherein the processor is further configured to perform a scaling process to scale at least one of the first image or the second image based on the first image information and the second image information, and wherein the first image and the second image stored by the processor include the at least one of the first image or the second image scaled based on the first image information and the second image information.

15. The image processing apparatus of claim 1, wherein the controller is further configured to:
acquire second size information indicating a second document image size of the second sheet surface;
determine a difference between the first document image size and the second document image size based on the first size information and the second size information;
determine the first image information based on the first size information and the difference;
generate the second image having the second image size indicated by the second image information.

* * * * *